US008117467B2

(12) United States Patent
Chang et al.

(10) Patent No.: US 8,117,467 B2
(45) Date of Patent: Feb. 14, 2012

(54) POWER MANAGEMENT DEVICE AND METHOD THEREOF FOR MANAGING POWER CONSUMPTION OF ELECTRONIC DEVICE

(75) Inventors: Shih-Jie Chang, Taipei Hsien (TW); Ling-Fan Tsao, Taipei Hsien (TW); Yin-Hsong Hsu, Taipei Hsien (TW); Shu-Chun Liao, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 646 days.

(21) Appl. No.: 12/289,379

(22) Filed: Oct. 27, 2008

(65) Prior Publication Data

US 2009/0327785 A1 Dec. 31, 2009

(30) Foreign Application Priority Data

Jun. 30, 2008 (TW) ............................... 97124639 A

(51) Int. Cl.
*G06F 1/00* (2006.01)
*G06F 1/26* (2006.01)

(52) U.S. Cl. ........ 713/300; 713/320; 713/323; 713/324; 713/340

(58) Field of Classification Search .................. 713/300, 713/320, 323, 324, 340
See application file for complete search history.

(56) References Cited

U.S. PATENT DOCUMENTS

| 6,049,879 | A * | 4/2000 | Davis et al. .................... 713/300 |
|---|---|---|---|
| 6,710,578 | B1 * | 3/2004 | Sklovsky ....................... 320/127 |
| 7,058,480 | B1 * | 6/2006 | Kawanishi et al. ............ 700/286 |
| 7,508,169 | B2 * | 3/2009 | Miskovic et al. .............. 320/132 |
| 2004/0041538 | A1 * | 3/2004 | Sklovsky ....................... 320/127 |
| 2004/0123172 | A1 * | 6/2004 | Sheller ............................ 713/323 |
| 2004/0268166 | A1 * | 12/2004 | Farkas et al. ................... 713/320 |
| 2006/0136793 | A1 * | 6/2006 | Wang et al. .................... 714/718 |
| 2008/0104430 | A1 * | 5/2008 | Malone et al. ................. 713/300 |
| 2008/0158390 | A1 * | 7/2008 | Chuang .................... 348/231.99 |
| 2008/0209247 | A1 * | 8/2008 | Thelander et al. ............. 713/323 |
| 2009/0094473 | A1 * | 4/2009 | Mizutani ........................ 713/340 |

* cited by examiner

*Primary Examiner* — Vincent Tran
(74) *Attorney, Agent, or Firm* — Stites & Harbison, PLLC; Juan Carlos A. Marquez, Esq.

(57) ABSTRACT

A power management device and method thereof for managing power consumption of an electronic device are disclosed. The electronic device has at least one adjustable unit and each adjustable unit has a plurality of power statuses. The method includes the following steps: generating a collection table having a plurality of power status collections according to the plurality of power statuses; selecting a power status collection from the collection table; measuring the power consumption corresponding to the selected power status collection; and providing the measured power consumption to the user.

15 Claims, 6 Drawing Sheets

POWER MANAGEMENT DEVICE AND METHOD THEREOF FOR MANAGING POWER CONSUMPTION OF ELECTRONIC DEVICE

CROSS REFERENCE TO RELATED APPLICATIONS

This application claims priority of Taiwan Patent Application Serial No. 97124639 entitled "POWER MANAGEMENT DEVICE AND METHOD THEREOF FOR SAVING POWER CONSUMPTION OF ELECTRONIC DEVICE", filed on Jun. 30, 2008.

TECHNICAL FIELD

The present invention relates to a power management device and method, and more particularly to a power management device and method for managing power consumption.

BACKGROUND OF THE INVENTION

As the electronic technology developed, various electronic products are broadly implemented in various fields and accepted by consumers. Some of them become very important for the purpose of either working or entertainment, such as personal computer, laptop computer, personal digital assistant, smart phone, etc. In response to the increasing demands from users, manufacturers begin to integrate multiple functions in a single device in order to maintain the competitiveness of the products. However, power consumption significantly arises due to the complexity of the products and becomes a critical problem.

To reduce the power consumption of the electronic products and increase the performance and stand-by time, a typical solution is to adjust the power status of the electronic product according different situations. For example, a user may switch his computer to maximum performance status when he requires intense calculations such as 3D modeling, and to minimum performance status when he only requires simple functions such as instant messaging or email. Thus, the product may provide high performance or low power consumption depending on the user's needs.

However, as more and more components provide adjustable power status, the conventional mechanism to adjust and manage the power consumption fails to provide users with accurate information and efficient management. Only a simple display of different power status cannot fulfill the increasing needs for accurate and easy management of power consumption.

In addition, many electronic products are customizable for user to add or replace components therein in order to provide new features or enhancements. For example, a computer user may purchase components such as memory, hard disk drive, wireless adaptor, etc, from a third supplier and perform installation on his own. In this circumstance, the power consumption of the electronic product will be affected due to the additional components. The conventional mechanism also fails to reflect such changes as well as provide user accurate and enough information with regard to such changes.

Therefore, it is advantageous to provide a user-friendly and accurate device and method for managing power consumption.

SUMMARY OF THE INVENTION

A power management device and method thereof for managing power consumption of an electronic device are disclosed.

One aspect of the present invention discloses a power management method for managing power consumption of an electronic device. The electronic device may include at least one adjustable unit and each adjustable unit may have a plurality of power status. The method may include the following steps: generating a collection table having a plurality of power status collections according to the plurality of power status of the at least one adjustable unit; selecting a power status collection from the collection table; measuring the power consumption corresponding to the selected power status collection; and providing the measured power consumption to the user.

Another aspect of the present invention discloses an electronic device capable of managing power consumption including at least one adjustable unit, a measurement device, a management device and a storage device. Each adjustable unit may include a plurality of power statuses. The measurement device may measure the power consumption of the electronic device. The management device may generate a collection table according to the plurality of power statuses, and select a power status collection from the collection table for measurement device measuring the corresponding power consumption to obtain a consumption table according to the measured power consumption. The storage device may store the collection table and the consumption table. In response to a user adjusting the power status collection to another power status collection, the management device may query the power consumptions corresponding to each power status collections and provide the comparison result between power consumptions to the user.

DETAILED DESCRIPTION OF THE PREFERRED EMBODIMENTS

Several embodiments of the present invention will be described in detail below. However, the present invention may be applied broadly to other embodiments. The present invention is not limited to the detailed description, and the scope of the present invention should be construed according to the appended claims. The present invention may applied to any electronic device with at least one adjustable unit, including but not limited to personal computer, laptop computer, personal digital assistant or smart phone.

<Complete Measurement>

Figure 1:
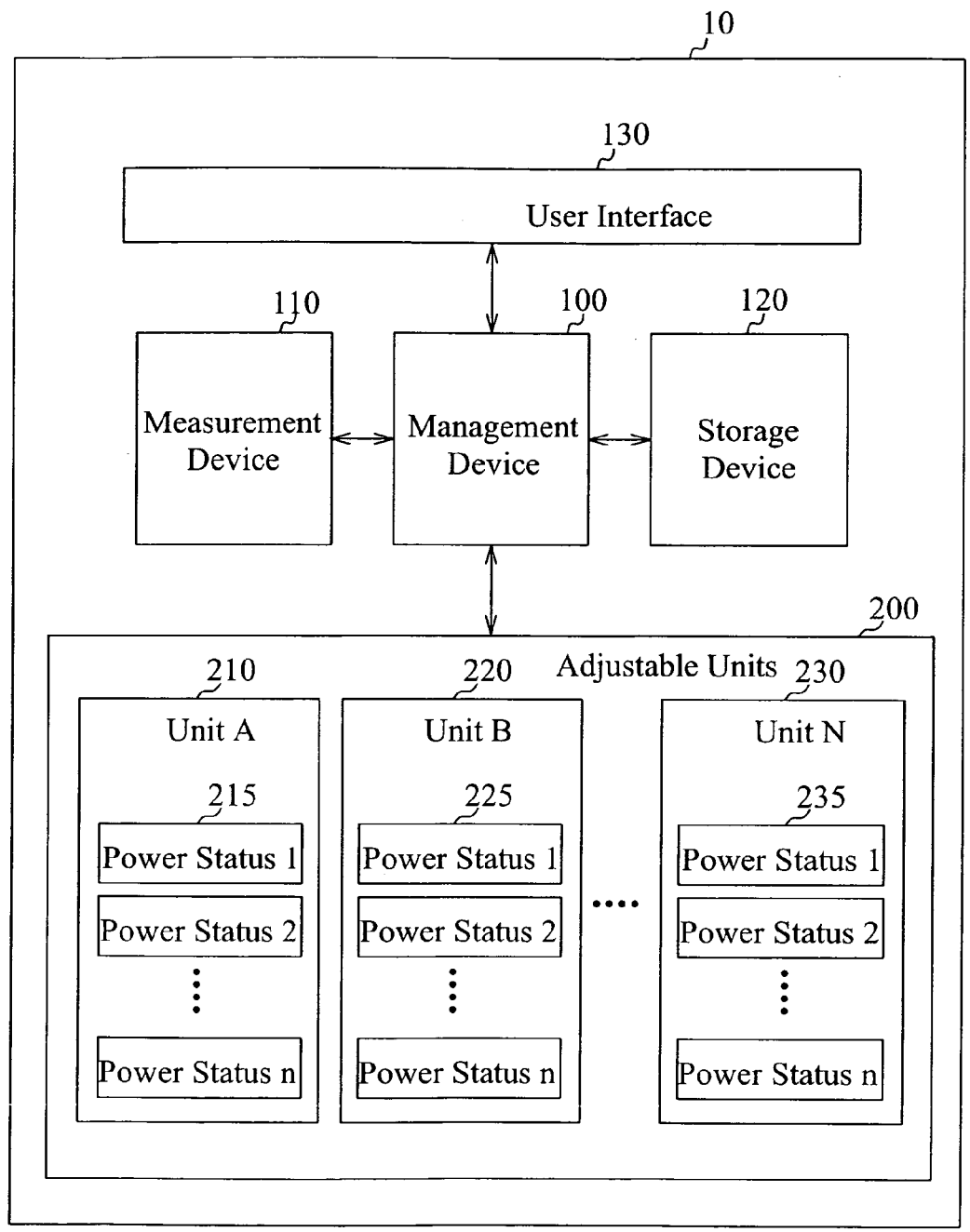
FIG. 1 is a schematic view of the electronic device according to one embodiment of the present invention.

FIG. 1 is a schematic view of the electronic device 10 according to one embodiment of the present invention. The electronic device 10 has a management device 100 for managing power consumption of a plurality of adjustable units 200. The electronic device 10 has a management device 100, a measurement device 120, a user interface 130 and a plurality of adjustable units 200, i.e. unit A 210, unit B 220, . . . , and unit N 230 respectively including a plurality of power statuses 215, 225, . . . , and 235. The adjustable unit 200 referred herein means any components or modules having multiple power statuses for providing specific function(s) in the electronic device 10. For example, the adjustable unit 200 may be a processor with variable operating frequencies, display capable of adjusting brightness, etc, which will be discussed in details in the following paragraphs.

For better understanding to the present invention, a personal computer is used as an exemplary embodiment of the electronic device 10 and, however, it shall not be regarded as limitation of the present invention. Please note that the management device 100 referred herein may, without limitation, be implemented by any hardware and/or software in the electronic device 10. For example, management device 100 may be embodied as a chip embedded in the electronic device 100 or may be a set of computer-executable instructions for, when executed by the electronic device 10, performing the function(s) described hereunder. Management device 100 may detect the statuses of the electronic device 10 to control the adjustable units 200. Some typical adjustable units, adjustable items thereof and detecting method thereof are shown in Table 1. Please note that the descriptions in Table 1 are recited here for exemplary purposes rather than limitations, and the electronic device 10 may has more or less adjustable units and adjustable items in other embodiments of the present invention.

TABLE 1

| Adjustable Unit | Adjustable Item | Detection Method |
| --- | --- | --- |
| CPU | Operating frequency and voltage | Query operating system via API for CPU's all power management items, such as Maximum, High, Low, etc. |
| Display | Brightness | Obtain/configure through BIOS the brightness of the display, such as 100%, 90%, . . . , 0% |
| GPU | Operating frequency and voltage | Query operating system via API for GPU's all power management items, such as Maximum, Balance, Low, etc. |
| Wireless Antenna | Power configuration | Obtain/configure through BIOS the power configuration of the wireless antenna, such as on or off. |
| Wireless Adapter | Transmission Mode | Query operating system via API for wireless adapter's all power management items, such as Maximum performance, Low Saving, Medium Saving, Maximum Saving, etc. |
| Ethernet Adapter | Transmission Mode | Query driver via API for Ethernet adapter's all power management items, such as 1 GHz, 100 MHz, 10 MHz, etc. |
| Ethernet chip | Power configuration | Turn on or off the ethernet adapter via API |
| Bluetooth Antenna | Power configuration | Obtain/configure through BIOS the power configuration of the antenna, such as on or off. |
| Chipset on Mainboard | System power management configuration | Obtain/configure through BIOS the power configuration of the chipset, such as C4onC3 function provided by Intel chipset |
| 1394 Adapter | Power configuration | Turn on or off the 1394 adapter via API |

It should be noted that some components in the electronic device 10 are omitted for conciseness, such as components without adjustable item for managing power consumption. However, those skilled in the art should understand that it does not affect the embodiment of the present invention.

Figure 2:
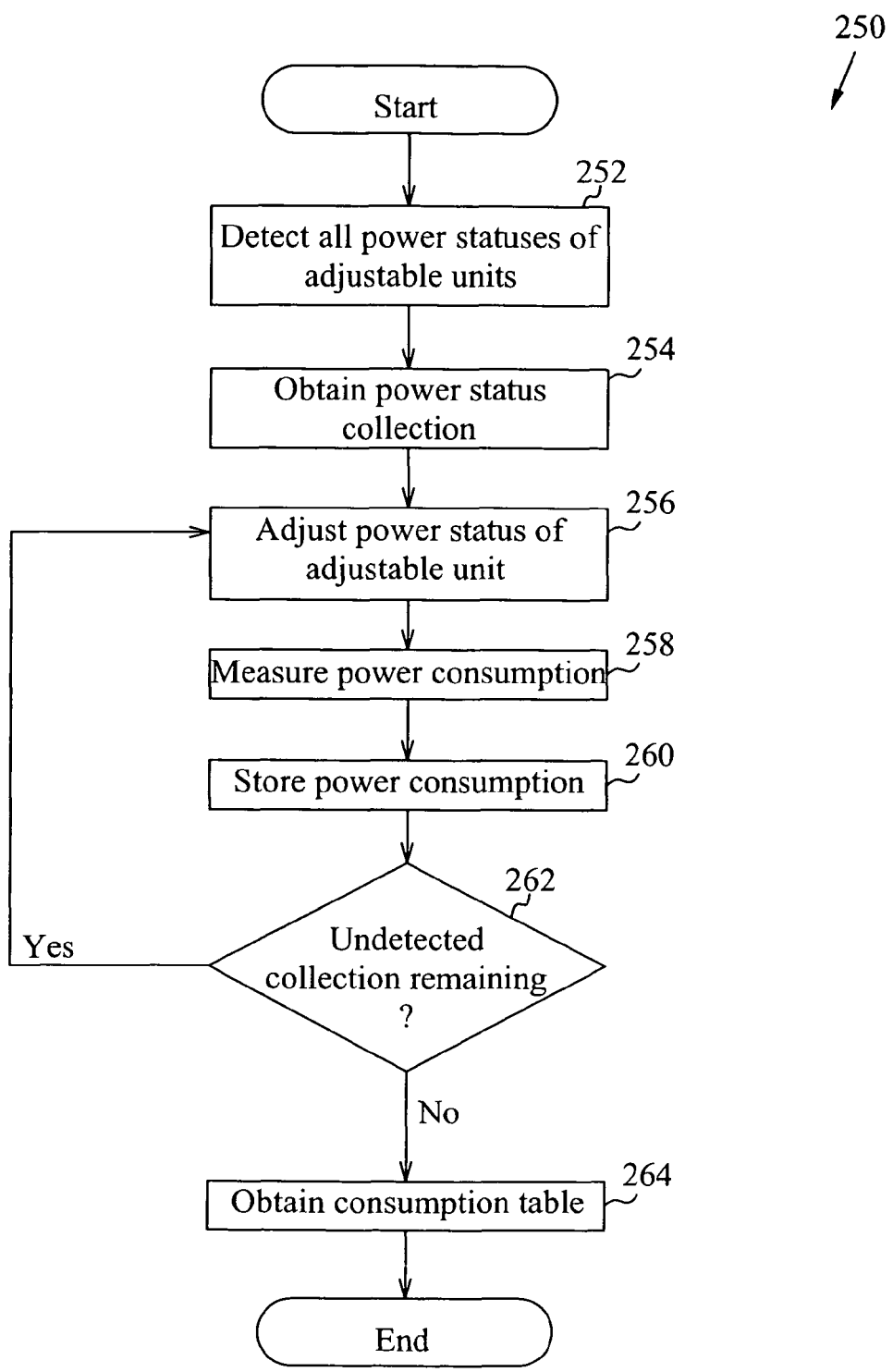
FIG. 2 is a flowchart illustrating a power management method according to another embodiment of the present invention.

Further refer to FIG. 2. FIG. 2 is a flowchart illustrating a power management method 250 according to another embodiment of the present invention. In step 252, management device 100 detects all adjustable units 200 in the electronic device 10, such as by the detection methods recited in Table 1. When the detection is completed, the results are stored in the storage device 120. For example, an exemplary result is shown in Table 2

TABLE 2

| Adjustable Unit | Adjustable Item |
| --- | --- |
| CPU | Maximum, High, Low |
| Display | 100%, 90%, . . . , 0% |
| GPU | High, Balance, Low |
| Wireless Antenna | On, Off |
| Wireless Adaptor | Maximum performance, Low Saving, Medium Saving, Maximum Saving |
| Ethernet Adapter | 1 GHz, 100 MHz, 10 MHz |
| Ethernet Chip | On, Off |
| Bluetooth Antenna | On, Off |
| Chipset on Mainboard | C4onC3 function provided by Intel chipset |
| 1394 Adaptor | On, Off |

When the detection is completed, the management device 100 may confirm all adjustable units 200 in the electronic device 10. By means of the detection result as shown in Table 2, the electronic device 10 may generate all power status collections corresponding to adjustable units, as shown in Table 3.

TABLE 3

| Adjustable Unit | Collection 1 | Collection 2 | Collection 3 | Collection 4 | Others |
| --- | --- | --- | --- | --- | --- |
| CPU | Maximum | High | Maximum | Low | . . . |
| Display | 100% | 90% | 60% | 50% | . . . |

TABLE 3-continued

| Adjustable Unit | Collection 1 | Collection 2 | Collection 3 | Collection 4 | Others |
|---|---|---|---|---|---|
| GPU | High | Balance | Low | Balance | ... |
| Wireless Antenna | On | On | Off | On | ... |
| Wireless Adaptor | Maximum Performance | Low Saving | Medium Saving | Maximum Saving | ... |
| Ethernet Adapter | 1 GHz | 1 GHz | 100 MHz | 10 MHz | ... |
| Others | ... | ... | ... | ... | ... |

Table 3 only recites part of all collections for conciseness, however, those who skilled in the art could easily complete the table based on the disclosure herein.

From step 256 to step 262, the management device 100 may in turn adjust the electronic device 10 to each of the power status collection, and respectively measure the power consumptions corresponding to each collection (step 258). The measurement method will be discussed later. The measured power consumptions are then stored in the storage device 120, and one embodiment of a consumption table is shown in Table 4.

TABLE 4

| Adjustable Unit | Collection 1 | Collection 2 | Collection 3 | Collection 4 | Others |
|---|---|---|---|---|---|
| CPU | Maximum | High | Maximum | Low | ... |
| Display | 100% | 90% | 60% | 50% | ... |
| GPU | High | Balance | Low | Balance | ... |
| Wireless Antenna | On | On | Off | On | ... |
| Wireless Adaptor | Maximum Performance | Low Saving | Medium Saving | Maximum Saving | ... |
| Ethernet Adapter | 1 GHz | 1 GHz | 100 MHz | 10 MHz | ... |
| Others | ... | ... | ... | ... | ... |
| Power Consumption | 25 W | 23 W | 24 W | 20 W | ... |

<Information of Power Consumption>

Figure 3:
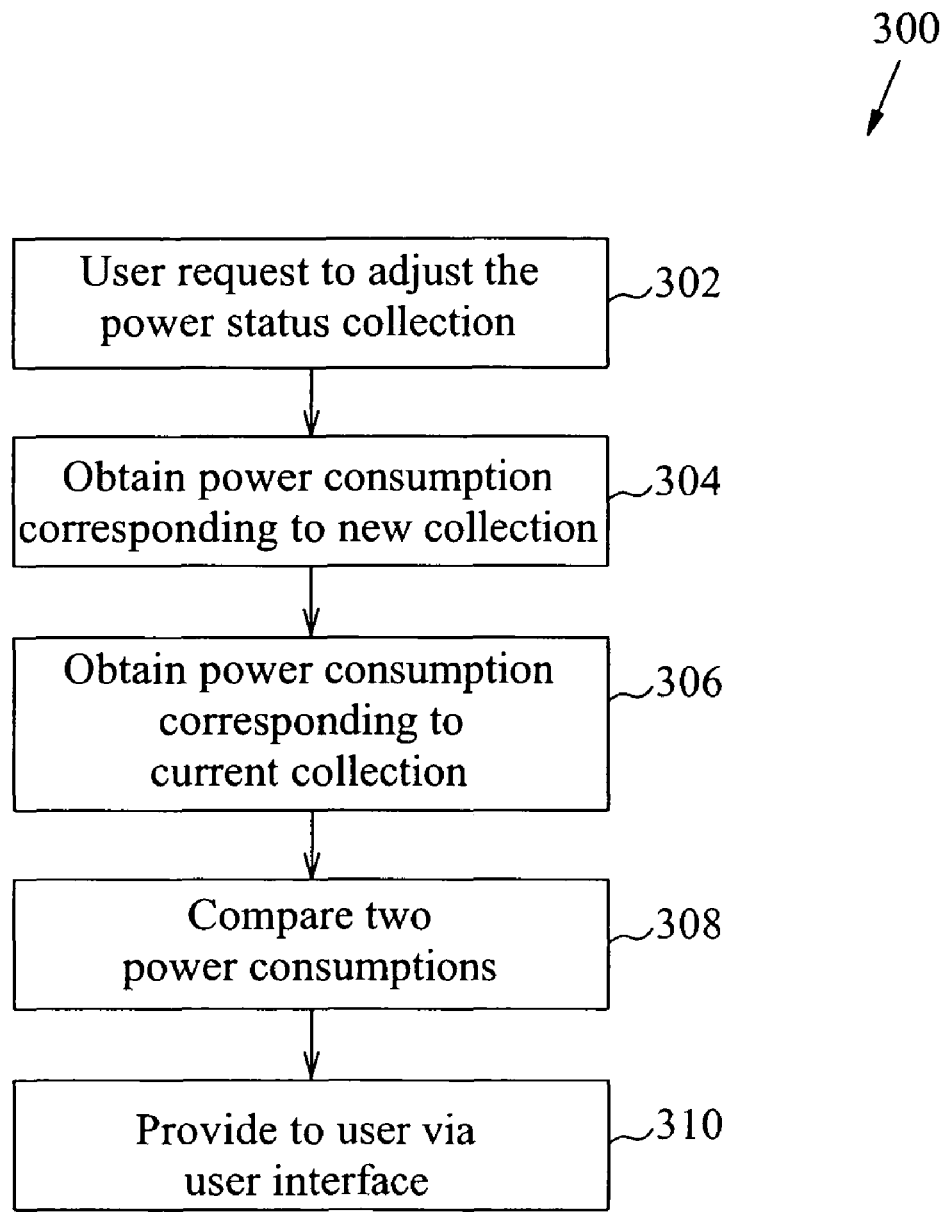
FIG. 3 is a flowchart illustrating a power management method according to yet another embodiment of the present invention.

When a user requests to adjust between different power status collections, the management device 100 may immediately provide detail and accurate information of power consumption based on the consumption table. FIG. 3 is a flowchart illustrating a power management method 300—according to yet another embodiment of the present invention. In step 302, the user requests to adjust the power status collection. For example, the user may request to adjust the power status collection from collection 1 to collection 4. The management device 100 may obtain from the consumption table that the power consumptions corresponding to new collection is 20 W (step 304) and the power consumptions corresponding to current collection is 25 W. Thus, the saving of power consumption is 5 W or 20% and will be provided to the user via the user interface 130 (step 310). The user may immediately get the information regarding power saving between two collections through easily understandable information or diagram.

The user interface 130 referred herein shall be any combination of hardware and/or software capable of notifying any information to the user and/or receiving input from the user. For example, the electronic device 10 may show the information in text or picture through monitor in conjunction with appropriate software program. Alternatively, the electronic device 10 may play the information in sound through audio adapter/speaker in conjunction with appropriate software program. In addition, the user interface 130 may also be embodied as other input/output device such as mouse, keyboard, trackball and/or touch panel.

As described above, one aspect of the present invention not only quickly provide information of power saving to the user, but also provide accurate power consumption based on actual measurement. Besides, management device 100 may always display a basic value for reference, such as a maximum power consumption value as all units adjusted to highest power consumption, a minimum power consumption value as all units adjusted to lowest power consumption or a selected power consumption value corresponding to any one of power status collections. As a result, the user may easily determine the power consumption and power saving in any circumstances.

Furthermore, another aspect of the present invention actually measures the power consumption of the electronic device 10 so that the accurate result may still be obtained even when the user adds or replaces any component in the electronic device 10.

<Partial Measurement>

Figure 4:
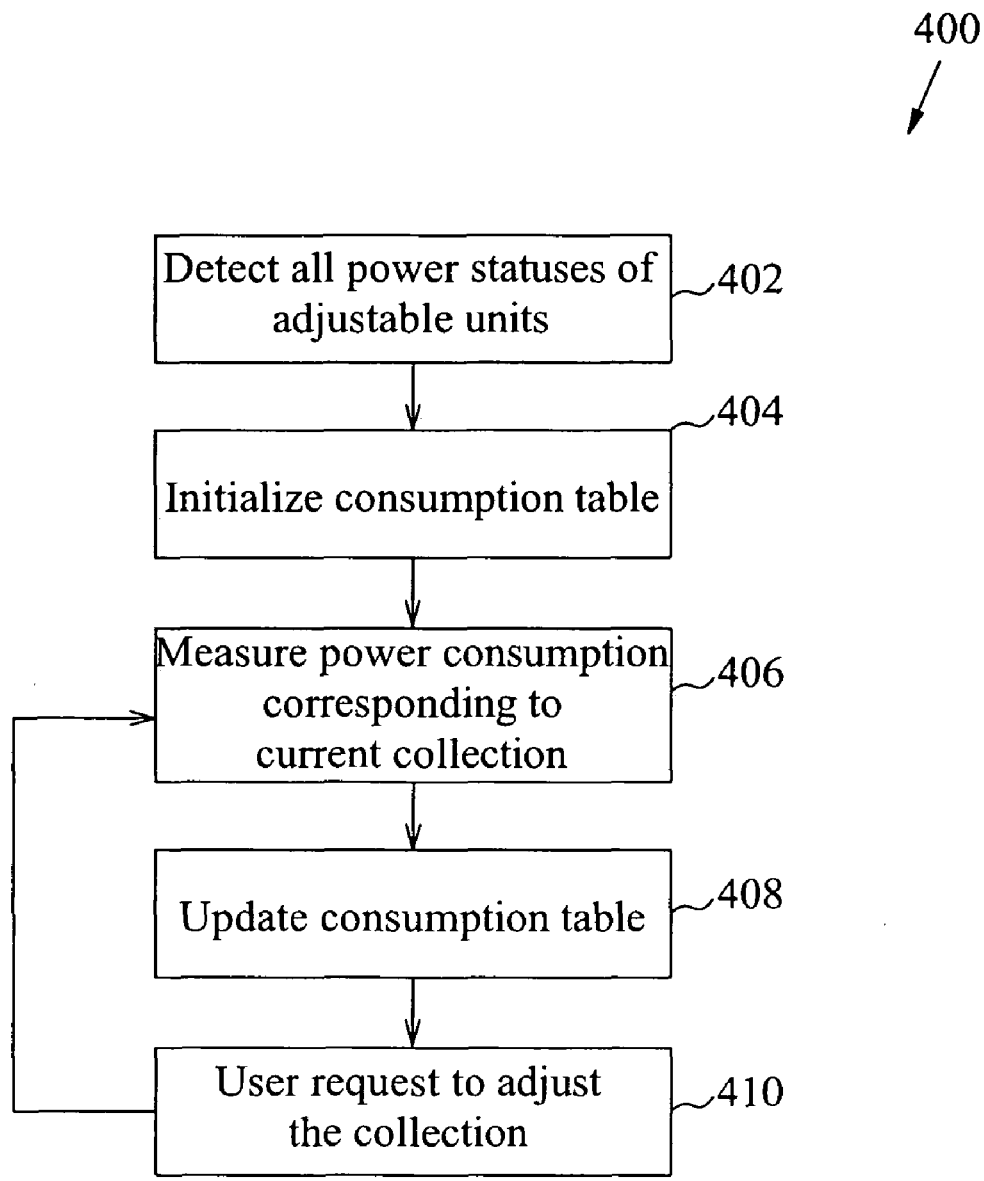
FIG. 4 is a flowchart illustrating a power management method according to still another embodiment of the present invention.

The complete measurement as described above may completely measure power consumptions corresponding to all power status collections, and thus the required time for performing such measurement will be relatively longer. Therefore, the complete measurement is recommended to be used for initializing, booting-up, complete calibrating, or any other circumstances necessary for a entire and complete test. However, another aspect of the present invention may also provide partial measurement for more flexible applications. FIG. 4 is a flowchart illustrating a power management method 400 according to still another embodiment of the present invention. In step 402, management device 100 detects all adjustable units 200 in the electronic device 10 and generates the collection table as described above. In step 404, an initial consumption table may be used instead of performing complete measurement. The initial consumption table may be prepared during manufacturing of the electronic device 10 or apply an estimation values based on predetermined algorithm or formulation.

In step 406, the management device 100 may only measure the power consumption corresponding to the current power status collection, thus the measurement time may be significantly reduced and the user needs not to wait for a relative long period for performing the complete measurement. In step 408, the management device 100 may store the measured power consumption in the storage device 120. In response to the user requesting to adjust the power status collection in step 410, the management device 100 may then measured the power consumption corresponding to the new collection and update the consumption table with the newly measured value. The partial measurement is recommended to be used for circumstances requiring quickly response.

<Measurement of Power Consumption>

Figure 5:
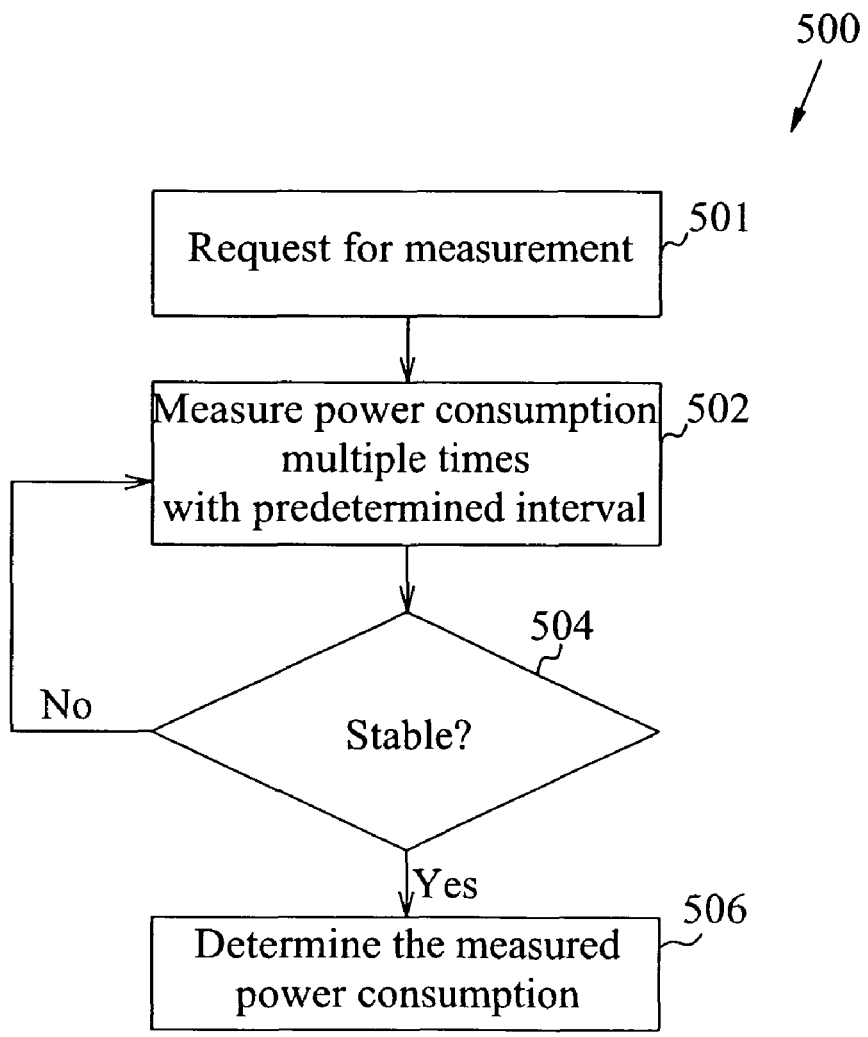
FIG. 5 is a flowchart illustrating a power management method for measuring power consumption according to further another embodiment of the present invention.

FIG. 5 is a flowchart illustrating a power management method 500 for measuring power consumption according to further another embodiment of the present invention. In step 501, the management device 100 may send a request signal to measurement device 110 to measure the power consumption of the electronic device 10. In step 502, the measurement device 110 may measure the power consumption of the electronic device 10 several times with a predetermined interval. For example, it is measured for three times with 10 seconds interval between each measurement. In step 504, measurement device 110 may determine whether the measured value is stable. In this embodiment, for example, the three measured values are compared to determine whether they are within a predetermined variation range, such as 5% tolerance. If so, the last value may be used as the measured power consumption (step 506). Alternatively, the measured power consumption may be determined by average, median, or any other mathematical refinement to the three or more measured values. If the measured results are determined as unstable, the process returns to step 502 to re-perform the measurement. In this embodiment, the measurement device 110 measures the entire power consumption of the electronic device 10 as measured value. In other embodiments, however, the measurement of power consumption may also be performed against individual unit.

Figure 6:
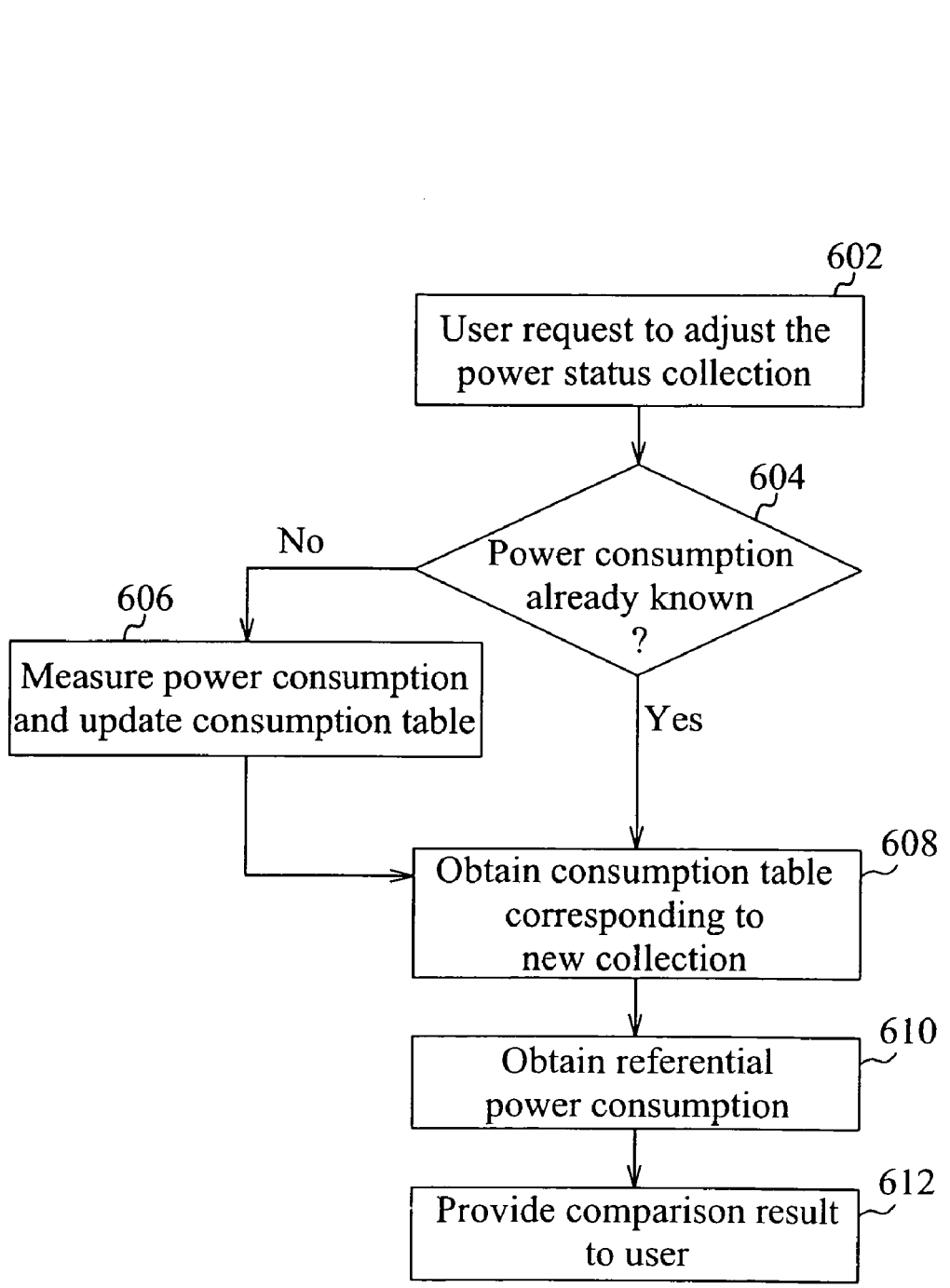
FIG. 6 is a flowchart illustrating a power management method according to still further another embodiment of the present invention.

FIG. 6 is a flowchart illustrating a power management method 600 according to still further another embodiment of the present invention. In the case of partial measurement, the consumption table may only contain data corresponding to part of power status collections. Therefore, in response to the user requesting to adjust power status collection in step 602, the management device 100 may determine the new power status collection from the collection table. Then in step 604, the management device 100 may determine whether power consumption corresponding to such collection has already existed in the consumption table. If not, the management device 100 may request measurement device 110 to perform measurement of power consumption corresponding to such collection and then update the consumption table accordingly. The management device 100 may obtain the power consumption corresponding to such collection in step 608 and obtain the referential value in step 610, such as maximum power consumption, and then provide information to the user via the user interface 130 in step 612.

Based on the above descriptions, it is understandable that the present invention may be implemented in many different embodiments, such as complete measurement and the partial measurement. However, the present invention may still have many variations or modifications. For example, the complete measurement and the partial measurement may be alternately implemented according to design requirements in order to provide more flexible applications. Further, the update of consumption table may be implemented in circumstances other than those described in FIG. 6. For example, the update may be performed regularly or upon a specific instruction from the user.

Please also note that any descriptions and/or drawings with regard to any components, modules, units, devices and/or process are merely for illustrative purpose rather than limitations. For example, the management device 100, the measurement device 110 and storage device 120 may be a physically independent component in the electronic device 10, such as the management device 100 being a standalone chip, the measurement device 110 being a sensor and the storage device 120 being a hard disk drive. Alternatively, they may be entirely or partially embedded in an integral component, such as the storage device 120 being an embedded flash memory in the management device 100 and the measurement device 110 being a sensor embedded in the management device 100. Further alternatively, the management device 100 may entirely or partially implemented as an executable program for performing the above described function(s) upon execution by the electronic device 10.

The description shown above is only about the preferred embodiments of the present invention and is not intended to limit the scope of the invention. Any equivalent variations or modifications without departing from the spirit disclosed by the present invention should be included in the appended claims.

We claim:
1. A power management method for managing power consumption of an electronic device, the electronic device including at least one adjustable unit and each adjustable unit having a plurality of power status, the method comprising:
   detecting all power statuses of all adjustable units of the electronic device;
   selecting one power status from each adjustable unit to form one corresponding power status collection;
   generating a collection table including all power status collections corresponding to the adjustable units,
   selecting a power status collection from the collection table;
   measuring power consumption corresponding to the selected power status collection; and
   providing the measured power consumption to the user.
2. The method according to claim 1, further comprising:
   selecting another power status collection in response to the user;
   measuring power consumption corresponding to the another power status collection;
   comparing the power consumptions corresponding to the power status collections to obtain a comparison result; and
   providing the comparison result to the user.
3. The method according to claim 1, wherein the step of measuring further comprises:
   measuring the power consumption of the electronic device for predetermined times with a predetermined interval;
   determining whether the predetermined times of measured results are stable; and
   providing a stable result as the measured power consumption.
4. The method according to claim 3, wherein the step of determining further comprises:
   determining the measured results as stable when the predetermined times of measured results are within a predetermined variation range.
5. A power management method for managing power consumption of an electronic device, the electronic device including at least one adjustable unit and each adjustable unit having a plurality of power status, the method comprising:
   a) detecting all power statuses of all adjustable units of the electronic device;
   b) selecting one power status from each adjustable unit to form one corresponding power status collection; and
   c) generating a collection table including all power status collections corresponding to the adjustable units;
   d) selecting a power status collection from the collection table;
   e) measuring power consumption corresponding to the selected power status collection;
   f) repeating step d) and e) until all power status collections are measured;
   g) generating a consumption table; and
   h) providing power consumption corresponding to a user-selected power status collection.
6. The method according to claim 5, further comprising:
   i) a user adjusting from one power status collection to another power status collection;
   j) querying power consumptions corresponding to each power status collections;
   k) comparing the power consumptions corresponding to the power status collections to obtain a comparison result; and
   l) providing the comparison result to the user.

7. The method according to claim 5, further comprising:
   m) a user adjusting from one power status collection to another power status collection;
   n) measuring power consumption corresponding to the another power status collection; and
   o) updating the consumption table with the measured power consumption.

8. The method according to claim 5, wherein the step e) further comprises:
   e1) measuring the power consumption of the electronic device for predetermined times with a predetermined interval;
   e2) determining whether the predetermined times of measured results are stable; and
   e3) providing a stable result as the measured power consumption.

9. The method according to claim 8, wherein the step e3) further comprises:
   e4) determining the measured results as stable when the predetermined times of measured results are within a predetermined variation range.

10. An electronic device capable of managing power consumption, comprising:
   at least one adjustable unit, each adjustable unit including a plurality of power statuses;
   a measurement device for measuring the power consumption of the electronic device;
   a management device for generating a collection table according to the plurality of power statuses, and selecting a power status collection from the collection table for measurement device measuring the corresponding power consumption to obtain a consumption table according to the measured power consumption; and
   a storage device for storing the collection table and the consumption table;
   wherein, in response to a user adjusting the power status collection to another power status collection, the management device queries the power consumptions corresponding to each power status collections and providing the comparison result between power consumptions to the user.

11. The device according to claim 10, wherein, in response to a user adjusting from one power status collection to another power status collection, the management device instructs the measurement device to measure power consumption corresponding to the another power status collection, and updates the consumption table with the measured power consumption.

12. The device according to claim 10, wherein the management device detects all power statuses of all adjustable units of the electronic device, selects one power status from each adjustable unit to form one corresponding power status collection, and generates the collection table including all power status collections corresponding to the adjustable units.

13. The device according to claim 10, further comprising an user interface for receiving an input from the user and providing information to the user.

14. The device according to claim 10, wherein the measurement device measures the power consumption of the electronic device for predetermined times with a predetermined interval and provides a stable result as the measured power consumption.

15. The device according to claim 14, wherein the measurement device determines the measured results as stable when the predetermined times of measured results are within a predetermined variation range.

* * * * *